United States Patent Office 3,158,552
Patented Nov. 24, 1964

3,158,552
PROCESS FOR THE MANUFACTURE OF DESFERRIOXAMINES
Ernst Gaeumann and Vladimir Prelog, Zurich, Hans Bickel, Binningen, and Ernst Vischer, Basel, Switzerland, assignors to Ciba Corporation, New York, N.Y., a corporation of Delaware
No Drawing. Filed June 13, 1962, Ser. No. 202,079
Claims priority, application Switzerland, June 29, 1961, 7,642/61; Mar. 2, 1962, 2,579/62
14 Claims. (Cl. 195—80)

The term "ferrioxamines" describes growth-promoting substances that contain iron and have been isolated from vegetable organisms, more especially microorganisms, (see Bickel et al., Experientia 16, page 129 [1960]; Bickel et al., Helv. Chim. Acta 18, page 2129 [1960]). From these substances the iron can be removed, whereupon the corresponding desferri compounds—the desferrioxamines—are obtained. The iron-free compounds can easily be reformed to ferrioxamines by addition of iron ions. Their capability of forming complexes with iron enables the desferri compounds to be used in medicine, for example in the treatment of pathogenic deposits of ferriferous pigments in the organisms, such as occur in haemochromatosis and haemosiderosis.

The present invention is based on the surprising observation that the vegetable organisms first form the desferrioxamines which makes it possible to isolate them from the culture medium. It has further been observed that the formation of the ferrioxamines and/or desferrioxamines depends to a large degree on the iron content of the culture medium in which the vegetable organisms have been grown. A wide variety of microorganisms produce substantial amounts of ferrioxamines and/or desferrioxamines only when they are grown in the presence of a deficiency of iron, that is to say in nutrient media that contain less iron than is normally used in the culture of microorganisms. Even in the substantially complete absence of iron a considerable amount of desferrioxamine is formed, while above a certain iron concentration no desferrioxamine or ferrioxamine at all is produced. The maximum yield of ferrioxamine and desferrioxamine is at a very low iron concentration of the nutrient medium. Therefore, when it is desired to produce a maximum yield of desferrioxamine with a certain microorganism, it is of advantage to perform the cultivation in a medium that is poor in iron. Table 1 shows the dependence of the amount of ferrioxamine and/or desferrioxamine produced on the iron content of the culture medium, as illustrated by the example of the strain *Nocardia brasiliensis* ETH 27413 which forms desferrioxamine E and ferrioxamine E respectively.

TABLE 1

| Iron content of culture medium in mols of ferric sulfate per liter | Amount of ferrioxamine and/or desferrioxamine per liter, in mg. after 9 days' cultivation |
|---|---|
| Traces that cannot be measured | 280 |
| $2.5 \times 10^{-8}$ | 520 |
| $2.5 \times 10^{-7}$ | 170 |
| $2.5 \times 10^{-6}$ | below 5 |

According to the new process for the production of desferrioxamines the culture is effected in a nutrient solution which is deficient in iron until a substantial amount of desferrioxamine has formed, any ferrioxamine present is converted into desferrioxamine by adding a substance capable of forming iron complexes, and desferrioxamine is isolated from the nutrient medium.

As starting material there are used microorganisms which are suitable for the manufacture of ferrioxamines.

The nutrient medium contains the usual sources of carbon and nitrogen, for example glucose, saccharose, lactose, starch, alcohols such as mannitol or glycerine, amino acids, for example orinthine, peptides, proteins or degradation products thereof, such as peptone or tryptone, meat extracts, water-soluble constituents of cereal grains such as maize or wheat, distillation radicals from the manufacture of alcohol, yeast, seeds, more especially seeds of the rape or soybean or cotton plant, ammonium salts, or nitrates. As inorganic salts that may be present in the nutrient solution there may be mentioned, for example, chlorides, carbonates, sulfates, nitrates of alkali metals or alkaline earth metals, or of magnesium, zinc or manganese. In general the iron salt content should not exceed $10^{-7}$ mols per liter, but the optimum content of iron must be ascertained for each organism individually. When the nutrient solution is prepared with tap water, the amount of iron it contains must be taken into consideration as well.

The cultivation is performed under aerobic conditions, for example in a quiescent surface culture, or preferably submerged with agitation or stirring in shaking bottles or in the known fermenters aerated with air or oxygen. A suitable temperature ranges from 18 to 40° C. and is preferably 27° C. Under these conditions the nutrient solution displays in general a considerable desferrioxamine activity (measured as ferrioxamine activity after conversion of the desferrioxamine to ferrioxamine by means of iron (III) salt) after 4 to 10 days.

The ferrioxamine activity can be determined microbiologically by the modified Bonifas test (see Zaehner et al., Arch. Mikrobiol. 36, pages 325 et seq. [1960]), using as test solution a ferrimycin solution of 0.01 mg. per liter and as test strain *Staphylococcus aureus*.

Alternatively, the ferrioxamine concentration of the culture medium can be determined optically. For this purpose 5 ml. of culture liquid are agitated with 1.5 grams of sodium chloride, 1 ml. of a ferric sulfate solution of 0.1% strength and 5 ml. of benzyl alcohol for 5 minutes, then centrifuged, the organic phase is filtered and the extinction of the organic phase at 410 m$\mu$ is measured. As test solution an extract from non-inoculated nutrient medium, prepared in identical manner, is used.

The desferrioxamines can be isolated by the conventional methods. Any ferrioxamine present in the culture medium is converted into desferrioxamine by addition of a substance capable of forming iron complexes, for example 8-hydroxyquinoline. This operation may be carried out in the culture broth immediately after completion of the fermentation or at a later stage of the processing to remove at the same time any ferric ions introduced by the reagents used.

The following methods are particularly suitable for isolating the desferrioxamines:

(1) An adsorbent, for example an active carbon such as Norite activated charcoal, or an activated earth such as Frankonite (a silicate found in Germany, see Merck Index, 7th ed., 1960), fuller's earth or floridin (aluminum magnesium silicate, see the Merck Index, 7th ed., 1960) or an adsorbent resin such as Asmit (a m-phenylenediamine-formaldehyde condensation product used as decolorizer, see U.S. Patent 2,854,484, col. 2) may be used. The adsorbates are advantageously eluted with mixtures of water-miscible organic solvents with water, for example with water+methanol, water+pyridine, dilute acetic acid+methanol or water+methanol+glacial acetic acid+butanol mixtures. Particularly good results in eluting Frankonite or Norite adsorbates have been achieved with a mixture of 4 parts by volume of water with 1 part by volume of pyridine.

(2) The desferrioxamines can also be extracted from an aqueous solution thereof by means of an organic solvent. Particularly good results in these extractions have been obtained with higher organic alcohols, for example benzyl alcohol or isopropanol. It is of advantage to add inorganic salts, for example ammonium sulfate or sodium chloride, to the aqueous phase. From the resulting organic extracts the desferrioxamines can be obtained in an enriched form either by evaporation of the solvent or by precipitation with a suitable organic solvent, for example, ether, petroleum ether or ethyl acetate.

(3) According to another method the desferrioxamines are enriched by distribution between an aqueous solution and a solution of phenol in chloroform; the phenol content of the chloroform solution may be varied.

(4) According to another method of enriching and/or separating the desferrioxamines is chromatography, such as adsorption chromatography on various materials, for example on Norite, alumina, magnesium silicates, silica gel (silicic acid in the form of lustrous granules) or calcium sulfate, and also distribution chromatography on cellulose, starch, silica, gel, Celite (infusorial earth) or the like as carrier, or by chromatography on ion exchange resins, for example on Dowex 50 (a sulfonated polystyrene containing about 8% of divinylbenezne, of U.S. Patent 2,366,007), Amberlite IRC–50 (a polymer bead resin of methacrylic carboxylic acid type, of U.S. Patent 2,340,111) or the like.

(5) Another method of enriching the desferrioxamines is counter-current distribution according to Craig between two immiscible solvent phases, for which the following solvent system has proved particularly suitable: n - butanol+benzyl alcohol+0.001 N - hydrochloric acid+aqueous sodium chloride solution saturated at 19° C. 9:9:15:5).

(6) A useful method for enriching and/or separating the desferrioxamines consist in extraction by means of a liquid cation exchanger dissolved in a water-immissible solvent. Suitable ion exchangers are carboxylic acids having a molecular weight of 200–1000, e.g., dilinoleic acid or dialkyl-orthophosphates having a molecular weight of about 200–600, e.g., bis-(2-ethylhexyl)-orthophosphate; they can be used in the $H^+$ form or in the salt form, preferably the $Na^+$ form, or as a mixture of these two forms. Suitable solvents are water-immissible alcohols having 4–8 carbon atoms, preferably n-amyl alcohol or 2-ethyl-n-butanol. Extraction is performed within the pH range of 5.0–8.5, preferably 7.5 to 8.0. From the extracts, the desferrioxamines can be re-transferred into the aqueous phase by means of alkalis or acids, or alkaline or acid buffers within the pH ranges above 8.5 or below 3.0, preferably at pH 10.5–11.0, or 1.5–2.0.

The following examples illustrate the invention.

EXAMPLE 1

Streptomyces pilosus NRRL 2857 is grown by the submersion method in a nutrient solution containing per liter of tap water 20 grams of soybean flour and 20 grams of mannitol. The tap water contains 20 to 30 μg. of iron per liter. The nutrient medium is sterilized in the inoculation flasks or fermenters for 20 to 30 minutes under a pressure of 1 atmosphere (gauge), whereupon it has a pH value of 7.2 to 7.6. The culture medium is then inoculated with up to 20% of a partially sporulating vegetative culture of Staphylococcus pilosus NRRL 2857. Incubation is performed with thorough agitation of stirring at 24 to 30° C., the cultures in the fermenters being aerated with about 2 volumes of air per volume of solution per minute. After about 96 hours' cultivation the culture solution has attained its maximum content of desferrioxamines (content determined by way of the antisideromycin test).

3400 liters of active culture broth of Streptomyces pilosus NRRL 2857 are mixed with a solution of 850 grams of 8-hydroxyquinoline in 16 liters of methanol. After 1 hour 2% Hyflo Supercel (infusorial earth) is added as filter assistant and the mycelium is filtered off. To free the filtrate from excess 8-hydroxyquinoline it is percolated through a column of 45 liters of Amberlite IR–45 (OH− form) a weakly basic monofunctional anion exchange resin consisting of polystyrene cross-linked with divinyl benzene and containing amino groups. The pH value fo the percolate is adjusted with hydrochloric acid to 7.5. The active culture solution obtained in this manner is then conveyed in the upward direction through 4 ion exchange columns of 15 cm. diameter arranged in series. Each column contains 25 liters of Amberlite IRC–50 ($H^+$ form). Prior to the adsorption the content of each column is converted by treatment with 780 grams of sodium hydroxide solution in water to an extent of about 25% into the sodium form. The rate of adsorption is 150 liters per hour. The biological testing of the effluent of each column by way of the antisideromycin test reveals that column 1 is charged wholly, column 2 partially, while columns 3 and 4 have remained substantially uncharged. For elution column 1 is removed from the process and a column containing freshly regenerated resin treated with sodium hydroxide solution is introduced following upon column 4.

On completion of the adsorption column 1 is thoroughly washed with deionized water. The adsorbed active substance is eluted with 0.2 N-hydrochloric acid, the eluant being allowed to percolate downwards at a rate of 15 liters per hour. The 200 liters of active eluates are combined, adjusted with sodium hydroxide solution to pH=5.0, saturated with sodium chloride and extracted with benzyl alcohol in the ratio of 20:1 in a counter-current extractor. The benzyl alcoholic extract is stirred with 1 kg. of Hyflo Supercel and then clarified by suction filtration. The amount of iron complex present in the clear filtrate is determined, then about twice the amount of 8-hydroxyquinoline required for the removal is added, and the batch is stirred for 2 hours. The solution, which has by now turned greenish black, is mixed with two parts by volume of methylisobutyl ketone and extracted with water in the ratio of 5:1 in a counter-current extractor. To free the aqueous extracts from excess 8-hydroxyquinoline they are then extracted with chloroform. This aqueous solution of yellow-orange color, amounting to 30 liters, contains about 500 grams of solid matter. To isolate the desferrioxamine-B-hydrochloride the aqueous solution is cautiously concentrated under vacuum to 1.5 liters, whereupon the desired product begins to crystallize out. Crystallization is completed by allowing the batch to stand at +4° C.; the product is then suctioned off and washed with a cold mixture of equal parts by volume of methanol and water.

The crude product melts at 162–165° C.; the pure product obtained by recrystallization from water+methanol 1:9 and water+acetone 1:4 melts at 169–171° C.

Column 2 is eluted in identical manner to yield an eluate containing 220 grams of solid matter. Crystallization of the aqueous concentrate furnishes 112 grams of a product melting at 168.5–171° C. Crystallization of the mother liquor furnishes a further 40 grams of a product melting at 164–166.5° C. On subjecting the two crystallizates to recrystallization from aqueous methanol and aqueous acetone, pure desferrioxamine-B-hydrochloride melting at 170.5–172° C. is obtained.

EXAMPLE 2

3000 liters of culture broth prepared as described in Example 1 are mixed with 90 kg. of Hyflo Supercel, the whole is filtered through a filter pass, and the filtrate (pH=6.1) is pumped upward at a rate of 150 liters per hour through a series of 4 columns of 15 cm. diameter and 3.5 m. height, each filled with 25 liters of Amberlite IRC–50 ($H^+$ form). The adsorbates are worked up as described in Example 1. The biological tests of the purified products reveal the same result as in Example 1.

EXAMPLE 3

3200 liters of culture broth are freed from the mycelium as described in Example 2 and then pumped upward at a rate of 150 liters per hour through two series each comprising 4 ion exchange columns. The columns of the first series have a diameter of 10 cm. and a height of 2.5 m.; the columns of the second series have a diameter of 15 cm. and a height of 3.5 m. Each column of series 1 is filled with 3 liters of Amberlite IRC–50 (H+ form), while those of the second series are filled with 25 liters of Amberlite IRC–50 (H+ form) each.

The adsorbates are worked up as described in Example 1. Biological testing of the purified products reveals that columns 1 to 4 of the first series have taken up only little activity, while columns 1 to 4 of the second series behave in the same manner as those described in Examples 1 and 2.

EXAMPLE 4

Of 25 arbitrarily selected, different strains of Actinomycetes only 2 strains (Streptomyces ETH 21748 and ETH 21798) produce ferrioxamines that can be identified by way of the antagonism test when the following nutrient solution is used:

Soybean flour _____ grams__ 20
Mannitol _____ do____ 20
Tap water _____ liters__ 1
Salt solution _____ ml__ 10
Salt solution:
  $(NH_4)_2HPO_4$ _____ grams__ 100
  $KNO_3$ _____ do____ 50
  $MgSO_4.7H_2O$ _____ do____ 25
  Ferric citrate _____ do____ 10
  $ZnSO_4.7H_2O$ _____ do____ 5
  $MnCl_2$ _____ do____ 0.5
  $CoCl_2$ _____ do____ 0.5
  $CuSO_4.5H_2O$ _____ do____ 0.25
  $H_3BO_3$ _____ do____ 0.01
in five liters of water.

Of 71 arbitrarily selected, different Actinomycetes strains all produce ferrioxamines when the above nutrient solution is used without addition of salt. The strains tested were:

27001 similar to Streptomyces violaceoniger, 27002 similar to Streptomyces fradiae, 27005 Streptomyces sp., 27007 unidentified Streptomyces sp., 27009 Streptomyces galilaeus, 27010 Streptomyces antibioticus, 27013 Nocardia brasiliensis, 27015 Nocardia sp., 27025 similar to Streptomyces galilaeus, 27028 similar to Streptomyces galilaeus, 27033 Streptomyces viridochromogenes, 27053 Streptomyces polychromogenes, 27054 Streptomyces antibioticus, 27059 Streptomyces griseoflavus, 27067 Streptomyces antibioticus, 27068 Streptomyces olivaceus, 27070 Streptomyces venezuelae, 27074 Streptomyces olivaceus, 27077 Streptomyces antibioticus, 27081 Streptomyces griseoflavus, 27083 Streptomyces antibioticus, 27090 Streptomyces viridochromogenes, 27093 Streptomyces griseus, 27094 Nocardia brasiliensis, 27106 Streptomyces olivaceus, 27113 Streptomyces aureofaciens, 27116 Streptomyces olivaceus, 27122 Nocardia brasiliensis, 27132 Streptomyces griseus, 27140 Streptomyces antibioticus, 27150 Streptomyces olivaceus, 27151 Streptomyces griseus, 27152 Streptomyces lavendulae, 27164 Nocardia brasiliensis, 27175 Streptomyces noursei, 27188 Streptomyces echinatus, 27216 Streptomyces hirsutus, 27217 Streptomyces hirsutus, 27220 Streptomyces griseus, 27232 Streptomyces sp. not identified, 27269 Streptomyces sp., 27273 Streptomyces venezuelae, 27274 Streptomyces antibioticus, 27299 similar to Streptomyces fradiae, 27303 Nocardia brasiliensis, 27307 Streptomyces aureofaciens, 27362 Streptomyces fulvissimus, 27364 Streptomyces griseus, 27377 Streptomyces reticuli, 27380 Streptomyces sp., 27382 Streptomyces griseus, 27390 Nocardia brasiliensis, 27413 Nocardia brasiliensis, 27440 Nocardia asteroides, 27442 Streptomyces aureofaciens, 27454 Streptomyces viridochromogenes, 27465 Streptomyces polychromogenes, 27472 Nocardia asteroides, 27479 Streptomyces antibioticus, 27490 unidentified, Streptomyces sp., 27499 Nocardia asteroides, 27509 Streptomyces echinatus, 27510 Streptomyces olivaceus, 27516 Nocardia asteroides, 27525 Streptosporangium roseum, 27542 Streptomyces griseus, 27549 Streptomyces aureofaciens, 27556 Micromonospora fusca, 27559 Streptomyces sp.,[1] 27590 Streptomyces briseus [1] and 27596 Streptomyces galilaeus.

The above-mentioned strains were deposited with the Federal Institute of Technology under the above reference numbers.

EXAMPLE 5

The strain ETH 27413 Nocardia brasiliensis is grown submerged at 27° C. on the following nutrient:

Grams
Glucose _____ 20
Asparagine _____ 5
$MgSO_4.7H_2O$ _____ 1.0
$CaCl_2$ _____ 0.5
$K_2HPO_4$ _____ 1.0 in 1 liter of distilled water, with varying amounts of ferric sulfate.

After 9 days' incubation at 27° C. the amount of ferrioxamine E (or desferrioxamine, respectively) produced is determined by the antagonism test and optical determination of the extinction at 440 m$\mu$. (Culture filtered off, 1 mg. $FeCl_3$ per ml. added, extracted with an equal volume of chloroform+phenol (1 part by volume:1 part by weight), extinction in the filtered organic phase measured.)

*Ferrioxamine E (or Desferrioxamine E) Content Measured After 9 Days*

Ferric sulfate added:                        Mg. per liter
  Nil _____ 280
  $2.5 \times 10^{-8}$ molar _____ 520
  $2.5 \times 10^{-7}$ molar _____ 170
  $2.5 \times 10^{-6}$ molar _____ Under 5

EXAMPLE 6

The strain Streptomyces pilosus ETH 21748 (NRRL 2857) is grown submerged for 10 days on the following nutrient solution:

Percent
Mannitol _____ 2
Soybean flour _____ 2

Tap water and varying amounts of ferric chloride. The tap water contins 20 to 30 $\mu$g. of iron per liter.

The determination of ferrioxamines produced (main product is ferrioxamine B) is carried out by way of the antagonism test.

*Content of Ferrioxamines After 10 Days*

[Activity corresponding to mg. of ferrioxamine B per liter]

| Ferric chloride added, mg. per liter | Ferrioxamine, mg. per liter |
|---|---|
| Nil | 480 |
| 10 | 150 |
| 100 | 5 |
| 1,000 | under 1 |

---

[1] In the first test these strains gave negative results but in a verification test it was found that they are likewise capable of producing sideramine.

EXAMPLE 7

3400 liters of culture broth, obtained as described in Example 1, after the addition of 60 kg. of Hyflo Supercel and adjustment of the pH to 4.5 with about 2 liters of 50% sulfuric acid, are filtered through a rotary filter.

3000 liters of clear filtrate are extracted in a counter-current extractor, the pH value being continuously adjusted to 7.6–7.8 with 0.4-N sodium hydroxide solution, by means of a 5% solution of bis (2-ethylhexyl)-orthophosphate (in the $Na^+$ form) in 2-ethyl-n-butanol in the ratio 4:1. After the extraction, the aqueous phase has a pH of 8.0 and contains but 2% of the initial activity. The extract obtained (750 liters) is washed in the ratio 5:1 with 0.75% sodium chloride solution and then stirred with 0.5 N-hydrochloric acid so that the pH value of the aqueous extract is 1.7–1.9. The extraction ratio is about 3:1. Equilibration requires about 15–30 minutes.

From the 250 liters of aqueous re-extract, which contain 80–90% of the initial activity, desferrioxamine B can be obtained quantitatively in a high degree of purity by extraction with benzyl alcohol as described in example 1 or by extraction with a solution of phenol in chloroform of the ratio 1:1.

What is claimed is:

1. Process for the manufacture of desferrioxamines with the use of microorganisms selected from the group consisting of those of the genera Streptomyces and Nocardia, wherein the cultivation is performed in a nutrient solution containing at most $10^{-7}$ mol of iron salt per liter until a substantial quantity of desferrioxamine has formed and the desferrioxamine is isolated from the nutrient solution.

2. Process according to claim 1, wherein any ferrioxamine formed is converted into desferrioxamine by adding an iron-binding substance.

3. Process according to claim 1, wherein microorganisms of the genus Streptomyces are cultivated.

4. Process according to claim 1, wherein microorganisms of the genus Nocardia are cultivated.

5. Process according to claim 1, wherein *Streptomyces pilosus* NRRL 2857 is cultivated.

6. Process according to claim 1, wherein an iron complex-forming substance is added during the isolation of the desferrioxamine.

7. Process according to claim 6, wherein 8-hydroxyquinoline is added.

8. Process according to claim 1, wherein the desferrioxamines are adsorbed on a cation exchanger.

9. Process according to claim 8, wherein a cation exchanger containing carboxyl groups is used.

10. Process according to claim 8, wherein a liquid cation exchanger is used.

11. Process according to claim 1, wherein the adsorbed desferrioxamine is eluted with a member selected from the group consisting of a dilute acid and a sodium chloride solution.

12. Process according to claim 1, wherein the desferrioxamine is extracted by means of phenol+chloroform.

13. Process according to claim 1, wherein the desferrioxamine is extracted by means of benzyl alcohol.

14. Process according to claim 1, wherein the desferrioxamine is purified by counter-current distribution in the system benzyl alcohol:n-butanol:saturated sodium chloride solution: 0.001 N-hydrochloric acid 9:9:5:15.

References Cited in the file of this patent

UNITED STATES PATENTS 3,093,550    Gaeumann et al. _____ June 11, 1953